United States Patent [19]
Aziz

[11] Patent Number: 5,633,933
[45] Date of Patent: May 27, 1997

[54] METHOD AND APPARATUS FOR A KEY-MANAGEMENT SCHEME FOR INTERNET PROTOCOLS

[75] Inventor: Ashar Aziz, Fremont, Calif.

[73] Assignee: Sun Microsystems, Inc., Mountain View, Calif.

[21] Appl. No.: 680,438

[22] Filed: Jul. 15, 1996

Related U.S. Application Data

[63] Continuation of Ser. No. 258,272, Jun. 10, 1994, Pat. No. 5,588,060.

[51] Int. Cl.$^6$ ................................................. H04L 9/30
[52] U.S. Cl. ................................................. 380/30; 380/21
[58] Field of Search ................................. 380/30, 21, 25

[56] References Cited

U.S. PATENT DOCUMENTS

| | | | |
|---|---|---|---|
| 5,241,599 | 8/1993 | Bellovin et al. | 380/21 |
| 5,416,842 | 5/1995 | Aziz | 380/30 |
| 5,469,507 | 11/1995 | Canetti et al. | 380/30 |
| 5,544,246 | 8/1996 | Mandelbaum et al. | 380/23 |
| 5,548,646 | 8/1996 | Aziz et al. | 380/30 |

*Primary Examiner*—Salvatore Cangialosi
*Attorney, Agent, or Firm*—Irell & Manella LLP

[57] ABSTRACT

A first data processing device (node I) is coupled to a private network which is in turn coupled to the Internet. A second data processing device (node J) is coupled to the same, or to a different network, which is also coupled to the Internet, such that node I communicates to node J using the Internet protocol. Node I is provided with a secret value i, and a public value $\alpha^i$ mod p. Node J is provided with a secret value j, and a public value $\alpha^j$ mod p. Data packets (referred to as "datagrams") are encrypted using the teachings of the present invention to enhance network security. A source node I obtains a Diffie-Helman (DH) certificate for node J, (either from a local cache, from a directory service, or directly from node J), and obtains node J's public value $\alpha^j$ mod p from the DH certificate. Node I then computes the value of $\alpha^{ij}$ mod p, and derives a key $K_{ij}$ from the value $\alpha^{ij}$ mod p. A transient key $K_p$ is then generated at random, and $K_p$ is used to encrypt the datagram to be sent by node I. $K_p$ is then encrypted with key $K_{ij}$. Upon receipt of the encrypted datagram by the receiving node J, the node J obtains a DH certificate for node I, (either from a local cache, from a directory service, or directly from node J), and obtains the public value $\alpha^i$ mod p. Node I then computes the value of $\alpha^{ij}$ mod p and derives the key $K_{ij}$. Node J utilizes the key $K_{ij}$ to decrypt the transient key $K_p$, and using the decrypted transient key $K_p$, node J decrypts the datagram packet, thereby resulting in the original data in unencrypted form.

23 Claims, 4 Drawing Sheets

METHOD AND APPARATUS FOR A KEY-MANAGEMENT SCHEME FOR INTERNET PROTOCOLS

This is a continuation of application Ser. No. 08/258,272, filed Jun. 10, 1994 now U.S. Pat. No. 5,588,060.

BACKGROUND OF THE INVENTION

1. Field of the Invention:

The present invention relates to the field of key management schemes, and more particularly, the present invention relates to a key management scheme for Internet working protocols to provide additional security at the network layer.

2. Art Background:

The Internet comprises a spiderweb of connected networks which crisscross the globe and permit users to send and receive data packets between computers. Although many of the computers coupled to the Internet are disposed at fixed locations, portable computer systems may be physically moved from one location on a network to another. Wireless links coupling the computers to the Internet, including direct satellite links, also allow users to access the Internet from remote areas. As a result of the dramatic increase in the use of the Internet throughout the world, concerns regarding network security naturally arise.

A variety of schemes have been proposed to increase security on the Internet, and a number of these schemes have been adopted. For example, encryption and authentication procedures known as Privacy Enhanced Mail (PEM) provide for enhanced privacy in electronic mail ("e-mail") services over the Internet. Additionally, schemes for utilizing PEM for secure remote user authentication have also been proposed. (See, for example, copending U.S. patent application Ser. No. 08/253,802, filed Jun. 3, 1994 now U.S. Pat. No. 5,604,803, entitled "Method and Apparatus for Secure Remote User Authentication in a Public Network", assigned to the Assignee of this patent application, Sun Microsystems, Inc., and hereby incorporated fully by reference.)

However, even if a remote user has been authenticated, there still exists the possibility that an intruder (herein referred to as a "cracker") may mount an active attack to interject himself in data transfers across the Internet. Although a user may incorporate a scheme for secure remote user authentication prior to login, a cracker may sever one of the authenticated parties from the Internet connection, and receive and transmit substitute data packets to the other unwitting party (or potentially to both parties). Once the Internet connection is established, data packets are sent over the network in the clear. For example, a cracker may interject himself between, for example, a user "A" in communication with a user "B" on the Internet, and issue a disconnect command to user A. Upon receipt of the disconnect command from the cracker, user A believes that user B has severed the connection. The cracker may then take over the communication established with user B, such that user B does not know that user A is not sending him data packets. Thus, a number of security issues exist when sending data over the Internet, including a cracker's ability to monitor data packets in the clear and to interject himself in the communication line such that he may receive and send data packets to unwitting users. It is, therefore, advantageous to put authenticity and privacy features at the network layer on the Internet. However, the majority of the privacy and authentication protocols which have been proposed provide session oriented key management schemes. Unfortunately, many of the commonly used network layer protocols (for example IP) are session-less datagram oriented protocols.

The present invention provides a key management scheme that is particularly well suited for use in conjunction with session-less datagram protocols such as the Internet protocols, and the proposed replacement candidates known as Connectionless Network Layer Protocol ("CLNP") and Simple Internet Protocol Polymodal ("SIPP"). As will be described, the present invention's key management scheme prevents crackers from monitoring the transfer of data in the clear over the Internet by encrypting every data packet.

SUMMARY OF THE INVENTION

The present invention provides a key management scheme that is particularly suited to connectionless datagram protocols, such as the Internet protocol (IP). A first data processing device (node I) is coupled to a private network which is in turn coupled to the Internet. A second data processing device (node J) is coupled to the same, or to a different network, which is also coupled to the Internet, such that node I communicates to node J using the Internet protocol. Node I is provided with a secret value i, and a public value $\alpha^i$ mod p. Node J is provided with a secret value j, and a public value $\alpha^j$ mod p. Data packets (referred to as "datagrams") are encrypted using the teachings of the present invention to enhance network security. A source node I obtains a Diffie-Helman (DH) certificate for node J (either from a local cache, from a directory service, or directly from node J), and obtains node J's public value $\alpha^j$ mod p from the DH certificate. Node I then computes the value of $\alpha^{ij}$ mod p, and derives a key $K_{ij}$ from the value $\alpha^{ij}$ mod p. A transient key $K_p$ is generated at random and is used to encrypt the datagram to be sent by node I. The key $K_p$ is used for a configurable number of bytes, which is the maximum number of bytes the node will decrypt using $K_p$. $K_p$ is then encrypted with key $K_{ij}$. Upon receipt of the encrypted datagram by the receiving node J, the node J obtains a DH certificate for node I (either from a local cache, from a directory service or directly from node J) and obtains the public value $\alpha^i$ mod p. Node J then computes the value of $\alpha^{ij}$ mod p and derives the key $K_{ij}$. Node J utilizes the key $K_{ij}$ to decrypt the transient key $K_p$, and using the decrypted transient key $K_p$, node J decrypts the datagram packet, thereby resulting in the original data in unencrypted form. Accordingly, both the protocol and computational overhead of the present invention is low, changing packet encrypting keys requires no communication between sending and receiving nodes, and no establishment of a pseudo-session state between the two sides is required. The present invention may also be used in conjunction with datagram multicast protocols allowing a single encrypted datagram to be multi-cast to numerous receiving nodes coupled to the Internet.

NOTATION AND NOMENCLATURE

Figure 1:
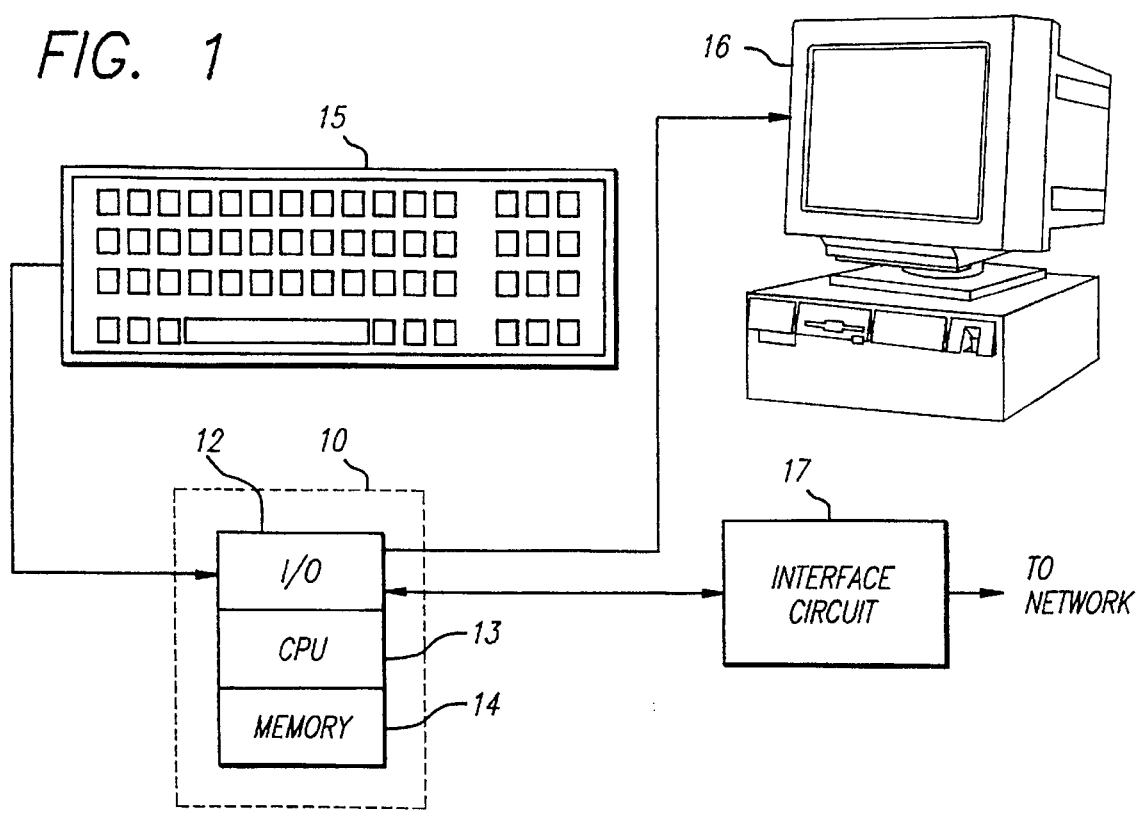
FIG. 1 illustrates a data processing system incorporating the teachings of the present invention.

The detailed descriptions which follow are presented largely in terms of symbolic representations of operations of data processing devices coupled to a network. These process descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities may take the form of electrical or magnetic signals capable of being stored, transferred, combined, compared, displayed and otherwise manipulated. It proves convenient at times, principally for reasons of common usage, to refer to these signals as bits, values, elements, symbols, operations, messages, terms, numbers, or the like. It should be borne in mind, however, that all of these similar terms are to be associated with the appropriate physical quantities and are merely convenient labels applied to these quantities.

In the present invention, the operations referred to are machine operations. Useful machines for performing the operations of the present invention include general purpose digital computers (referred herein as "nodes"), or other similar devices. In all cases, the reader is advised to keep in mind the distinction between the method operations of operating a computer and the method of computation itself. The present invention relates to method steps for operating a computer, coupled to a series of networks, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method/process steps presented herein are not inherently related to any particular computer or other apparatus. Various general purpose machines may be used with programs in accordance with the teachings herein, or it may prove more convenient to construct specialized apparatus to perform the required method steps. The required structure for a variety of these machines will be apparent from the description given below.

DETAILED DESCRIPTION OF THE INVENTION

This patent is related to U.S. patent application, Ser. No. 08/258,344, filed Jun. 10, 1994, now U.S. Pat. No. 5,416,842 entitled "METHOD AND APPARATUS FOR USE OF KEY MANAGEMENT FOR INTERNET PROTOCOLS TO SITE FIREWALLS", assigned to Sun Microsystems, Inc., and fully incorporated by reference herein.

In the following description, numerous specific details are set forth such as system and network configurations, representative data packets, messages, and devices, etc., to provide a thorough understanding of the present invention. However, it will be apparent to one skilled in the art that the present invention may be practiced without these specific details. In other instances, well known circuits and structures are not described in detail in order to not obscure the present invention. Moreover, certain terms such as "knows", "verifies", "examines", "utilizes", "finds", "determines", "challenges", "authenticates", etc., are used in this Specification and are considered to be terms of art. The use of these terms, which to a casual reader may be considered personifications of computer or electronic systems, refers to the functions of the system as having human-like attributes, for simplicity. For example, a reference herein to an electronic system as "determining" something is simply a shorthand method of describing that the electronic system has been programmed or otherwise modified in accordance with the teachings herein. The reader is cautioned not to confuse the functions described with everyday human attributes. These functions are machine functions in every sense.

EXEMPLARY HARDWARE

FIG. 1 illustrates a data processing system in accordance with the teachings of the present invention. Shown is a computer 10, which comprises three major components. The first of these is an input/output (I/O) circuit 12 which is used to communicate information in appropriately structured form to and from other portions of the computer 10. In addition, computer 10 includes a central processing (CPU) 13 coupled to the I/O circuit 12 and a memory 14. These elements are those typically found in most general purpose computers and, in fact, computer 10 is intended to be representative of a broad category of data processing devices. Also shown is an interface circuit 17 coupled to the I/O circuit 12 for coupling the computer 10 to a network, in accordance with the teachings herein. The interface circuit 17 may include encrypting and decrypting circuitry incorporating the present invention, or as will be appreciated, the present invention may be implemented in software executed by computer 10. A raster display monitor 16 is shown coupled to the I/O circuit 12 and issued to display images generated by CPU 13 in accordance with the present invention. Any well known variety of cathode ray tube (CRT) or other type of display may be utilized as display 16.

Figure 2:
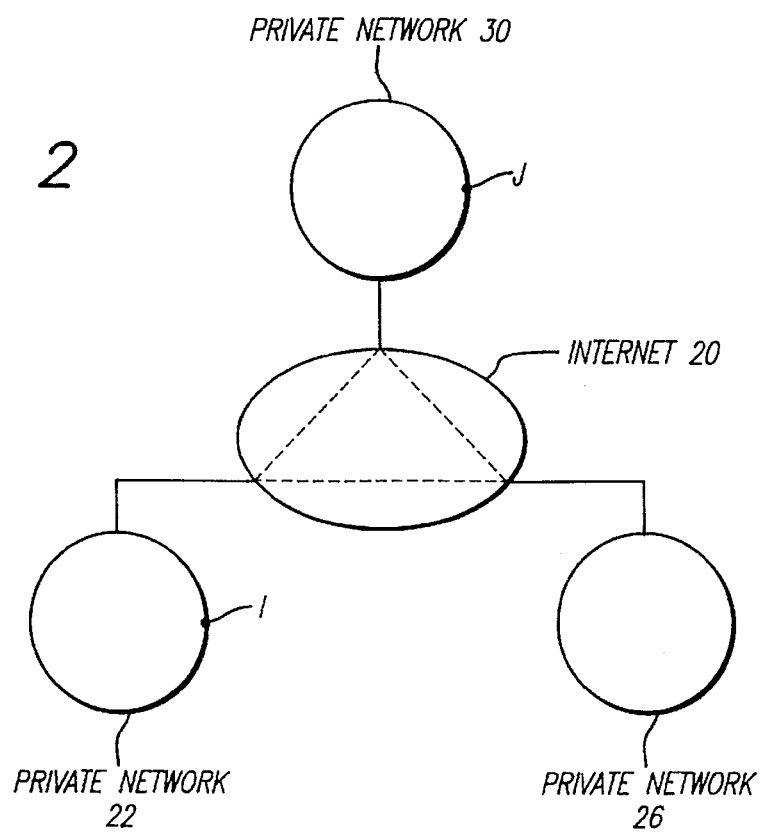
FIG. 2 diagrammatically illustrates one possible network scheme using the teachings of the invention in an Internet environment.

Referring now to FIG. 2, a simplified diagram conceptually illustrates the Internet 20 coupled to a private network 22, a second private network 26, and a third private network 30. The network topology illustrated in FIG. 2 is representative of the existing Internet topology, however, it will be noted that the present invention provides an improved key management scheme which has application for use in networks other than the Internet.

One of the unique aspects of the Internet system is that messages and data are transmitted through the use of datagram packets. In a datagram-based network, messages are sent from a source to a destination in a similar manner to a government mail system. For example, a source computer may send a datagram packet to a destination computer regardless of whether or not the destination computer is currently on-line and coupled to the network. The Internet protocol (IP) is completely session-less, such that IP datagram packets are not associated with one another.

In this Specification, the present invention will be described with reference to communication between a node I coupled to private network 22, and a node J coupled to the private network 30, as shown in FIG. 2. The nodes I and J represent computers, such as the computer illustrated in FIG. 1, coupled to their respective networks. For simplicity and ease of understanding, an operation by, for example, "node I", shall be understood to mean an operation by the computer coupled to network 22.

One way to obtain authenticity and privacy at a datagram layer like IP is to use RSA public key certificates.

Traditionally, in the event node I desires to send a datagram to, for example, node J, the node I communicates with node J and authenticates itself using a certificate based key management infrastructure. An example of a certificate based infrastructure key management for secure Internet e-mail is the Privacy Enhanced Mail (PEM) system (see the PEM RFC documents filed concurrent with the Application upon which this patent is based, and incorporated herein by reference, entitled "Privacy Enhancement for Internet Electronic Mail", parts I–IV rfcs 1421–1424, available on the Internet).

The certificates used by PEM are RSA public key certificates. An RSA public key certificate is one which contains an RSA public key. (See, A.Aziz, W.Diffie, "Privacy and Authentication for Wireless LANs", IEEE Personal Communications, February 1994; and also, W.Diffie, M.Wiener, P.Oorschot, "Authentication and Authenticated Key Exchanges".) There are two primary ways in which RSA certificates can be used to provide authenticity and privacy for a datagram protocol. The first way is to use out-of-band establishment of an authenticated session key, using one of several session key establishment protocols. This session key can then be used to encrypt IP data traffic. Such a scheme has the disadvantage of establishing and maintaining a pseudo session state on top of a session-less protocol. The IP source must first communicate with the IP destination to acquire this session key. In addition, when the session key must to be changed to insure security, the IP source and the IP destination need to communicate again to effectuate the change. Each such communication involves the use of a computationally expensive public-key operation. This communication requirement is particularly ill-suited to a datagram protocol like IP, which does not require the receiving computer to be in operation to send packets to it, although to establish and change negotiated session keys the receiving computer must be operational.

The second way an RSA certificate can be used to provide authenticity and privacy in a datagram protocol is to complete in-band signalling of the packet encryption key, such that the packet encryption key is encrypted in the recipient's public key. This is the method PEM utilizes to accomplish message encryption. Although this avoids the session state establishment requirement, and also does not require the two parties to communicate to set up and change packet encryption keys, this scheme has the disadvantage of having to carry the packet encryption key encrypted in the recipient's public key in every packet. Since an RSA encrypted key would minimally need to be 64 bytes, and can be 128 bytes, this scheme incurs the overhead of 64–128 bytes of keying information in every packet. In addition, when the packet encryption key changes, a public key operation would need to be performed to recover the new packet encryption key. Thus, both the protocol and computational overhead of such a scheme is high.

The use of Diffie-Hellman (DH) public-key certificates can avoid the pseudo session state establishment, and the communications requirement between the two communicating computers to acquire and change packet encrypting keys (see, W. Diffie, M.Hellman, "New Directions in Cryptography", IEEE Transactions on Information Theory). Furthermore, the use of a DH public-key certificate does not incur the overhead of carrying 64–128 bytes of keying information in every packet, and is better suited to protocols like IP, since it does not require the receiving computer to be operational to establish and change packet encrypting keys.

Use of DH Certificate Based Key-Management for Datagram Protocols

Figure 3:
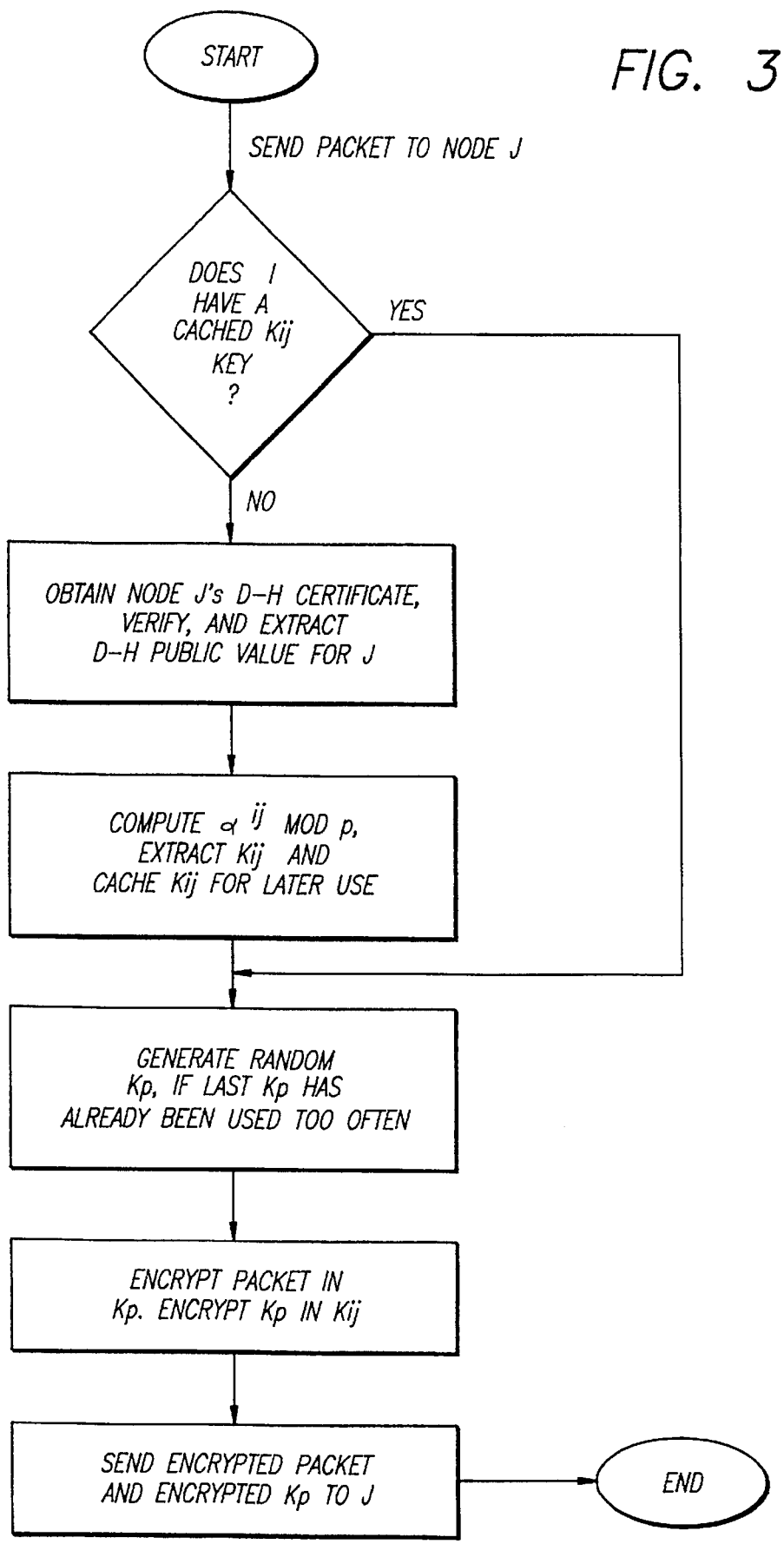
FIG. 3 illustrates a flow chart of the steps executed in sending an encrypted data packet from a network node I to a network node J, in accordance with the teachings of the present invention.
Figure 4:
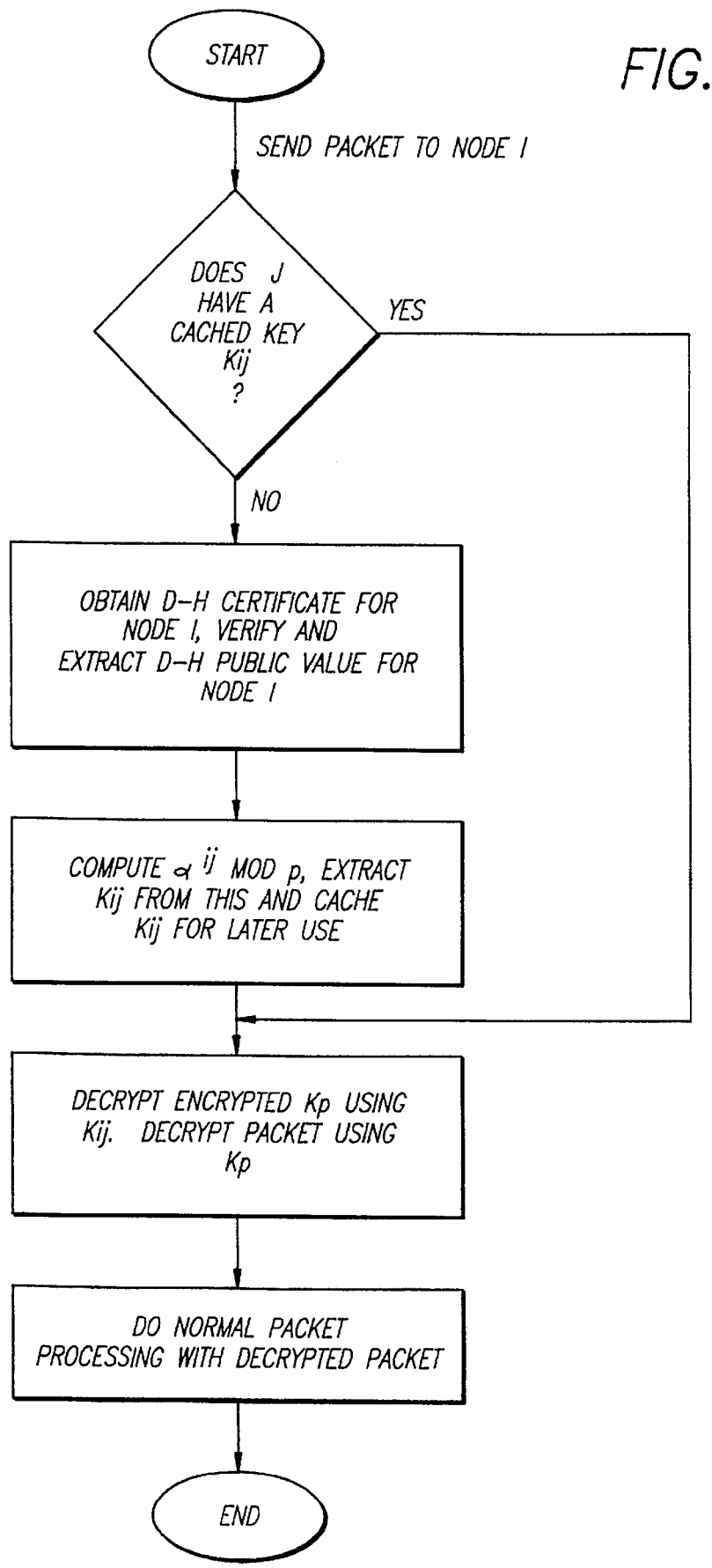
FIG. 4 is a flow chart of the steps executed for the receipt of encrypted data packets by node J from node I in accordance with the teachings of the present invention.

Referring now to the flow charts illustrated in FIGS. 3 and 4, the present invention utilizes DH public-key certificates for key management, such that each IP source and destination is provided with a Diffie-Hellman public key. This DH public-key is distributed in the form of a certificate. The certificate can be signed using either an RSA or DSA signature algorithm. The certificate is referred to herein as a "Diffie-Hellman" (DH) certificate, because the public value that is certified is a Diffie-Hellman public value.

It will be appreciated that the present invention's use of DH certificates to compute a shared key is fundamentally different than the use of the DH certificate to negotiate a session key, for example, as described in the paper by Whitfield Diffie, entitled "Authentication and Authenticated Key Exchanges" (Kluwer Academic Publishers, 1992), because the present invention uses a zero-message protocol to compute a shared secret. All past uses of DH certificates have involved exchanging messages between the two communicating parties.

In accordance with the teachings of the present invention, upon initialization each IP source or destination computer, for example node I, is provided with a secret value i, and computes a public value $\alpha^i$ mod p. Similarly, node J is provided with a secret value j, and computes a public value $\alpha^j$ mod p. For purposes of illustration, assume that node I wishes to communicate with a node J coupled to private network 30 in FIG. 2. Both I and J can acquire a shared secret $\alpha^{ij}$ mod p without having to communicate, as long as the public key of each IP node is known to all the other IP nodes. The values $\alpha$ and p are system parameters, where p is a prime number. It will be appreciated by one skilled in the art that local caching of DH certificates can eliminate the constant need for a directory service, thereby minimizing system overhead.

The computable shared secret may be used as a key-encrypting key to provide for IP packet based authentication and encryption. Thus, we denote the value $\alpha^{ij}$ mod p as the "long-term key", and derive from it a key $K_{ij}$. The key $K_{ij}$ is used as the key for a known shared-key cryptosystem (SKCS) like DES or RC2. It will also be noted that $K_{ij}$ is an implicit pair-wise shared secret. $K_{ij}$ does not need to be sent in every packet or negotiated out-of-band. Simply by examining the source of an IP packet, the destination IP node (for example, node J) can compute the shared secret $K_{ij}$.

The key $K_{ij}$ is derived from $\alpha^{ij}$ mod p by using the low order key-size bits of $\alpha^{ij}$ mod p. Since $\alpha^{ij}$ mod p is minimally at least 512 bits (and for greater security may be 1024 bits or higher), sufficient bits may be derived for use as $K_{ij}$ which is used as a key for the SKCS. Typically, SKCS key sizes are in the range of 40–172 bits.

As illustrated in the flow charts of FIGS. 3 and 4, the present invention then utilizes the key $K_{ij}$ to encrypt a "transient key", which is referred to as $K_p$. The key $K_p$ is generated at random to encrypt a configurable number of data packets. After the configurable number of data packets have been sent, a new $K_p$ is generated at random. The transient key $K_p$ is used to encrypt an IP data packet, or a collection of IP data packets. The encryption using $K_p$ limits the amount of data in the long-term key which a potential cracker can access. Since it is desirable to retain the long-term key for a relatively long period of time (one or two years), the actual IP data traffic is not encrypted in key $K_{ij}$. In the preferred embodiment of the invention, only the transient keys of the long-term key are encrypted using $K_{ij}$, and the transient keys are used to encrypt IP data traffic. Thus, the amount of data encrypted in the long-term key ($K_{ij}$) is limited to a relatively small amount over a long period of time.

The first time the IP source, such as node I, which has been provided with the secret value i, communicates with the IP node J which has been provided with a secret value j, the node I computes the shared secret $\alpha^{ij}$ mod p. The node I can then cache this shared secret as the long-term key $K_{ij}$. The node I then generates a random key $K_p$ and encrypts this key using $K_{ij}$. As illustrated in flow chart of FIG. 3, the node I encrypts the IP packet data in key $K_p$, and transmits the encrypted IP datagram packet and the encrypted key $K_p$. The outgoing datagram packet sent by the source node I takes the form illustrated in FIG. 5.

Figure 5:
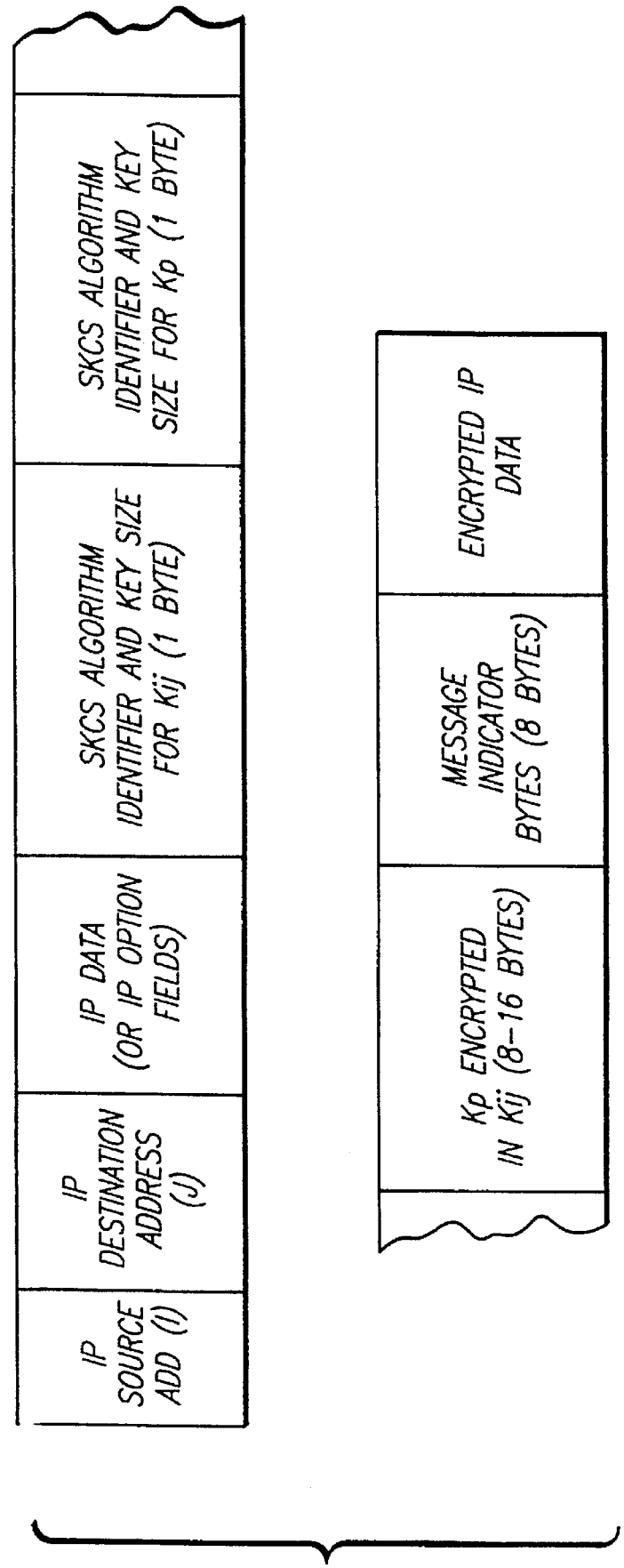
FIG. 5 diagrammatically illustrates the transmission format of an encrypted datagram.

It will be appreciated that to prepare the datagram packet illustrated in FIG. 5 for transmission on the outbound side of node I, no communication was necessary with the receiving node J. In addition, since $K_{ij}$ is used as the key for the SKCS, the length of the encrypted key $K_p$ is the block size of a shared-key cipher (typically 8 bytes), as opposed to the block size of a public-key cipher (typically 64–128 bytes), which would have been the case if RSA certificates had been used in conjunction with in-band signalling of the packet encryption key.

As shown in FIG. 4, when node J receives the datagram packet, the node J also computes the shared secret $K_{ij}$ and caches it for later use. Using $K_{ij}$ it obtains $K_p$, and using $K_p$ it decrypts the encrypted data which it then delivers to the appropriate local transport entity, or another outbound interface.

The Message Indicator (MI) shown in FIG. 5 is a field that is used to preserve the statelessness of the protocol of the present invention. If a single key is used to encrypt multiple packets, (which is highly desirable since changing the key on a per packet basis constitutes significant computational overhead) then the packets need to be decryptable regardless of lost or out-of-order packets. The MI field serves this purpose. The actual content of the MI field is dependent on the choice of SKCS used for $K_p$, and its operating mode. For example, if $K_p$ refers to a block cipher (e.g. DES) operating in Cipher-Block-Chaining (CBC) mode, then the MI for the first packet encrypted in key $K_p$ is the Initialization Vector (IV). For subsequent packets, the MI is the last blocksize-bits of ciphertext of the last (in transmit order) packet. For DES or RC2 this would be 64 bits. For stream ciphers like RC4, the MI is simply the count of bytes that have already been encrypted in key $K_p$ (and may also be 64 bits).

If the source node I decides to change the packet encryption key $K_p$, the receiving node J can discover this fact without having to perform a public-key operation. The receiving node J uses the cached value $K_{ij}$ to decrypt the encrypted packet key $K_p$, and this is a shared-key cryptosystem operation. Thus, without requiring communication between transmitting (I) and receiving (J) ends, and without necessitating the use of a public-key operation, the packet encrypting key can be changed by the transmitting side.

Since DH certificates are used, the nodes I and J have no public-key signature algorithm. It will be appreciated that the lack of a public-key signature algorithm is not a major issue, since signing each packet using a public-key cryptosystem is too cumbersome in any case. In accordance with the present invention, the integrity of the packets is determined in a pairwise fashion using a SKCS.

In order to retain the amount of data encrypted in any given key to be less than $2^{32}$ (assuming a 64-bit block cipher) at T1 speeds of 1.5 Mbits/sec, the packet encryption key must change roughly every six hours. This results in the amount of key material encrypted in the long-term key in a year to be roughly 24K bytes, well under the $2^{32}$ limit that would necessitate changing the long-term key more frequently than once a year.

It will also be noted that the present invention's key-management scheme does not provide for any level of playback protection. Most of the existing transport protocols deal with playbacks at the datagram layer. For example, TCP does sequencing of IP packets. Therefore it is not necessary to provide for this functionality at the datagram layer. If playback protection is important for a given application, then it would be built on top of the secure datagram protocol. Since the $K_{ij}$ values need to be cached for efficiency, reasonable safeguards need to be taken to protect these keys. One possible way to accomplish caching is to provide a hardware device to compute, store and perform operations using these keys. This device can ensure that there are no interfaces to extract the key from the device. It is contemplated that such a hardware device is incorporated within the CPU block 13 illustrated in FIG. 1.

It will be noted that the key management described herein may also be used to provide an integrity-only service for later packets. In this case, the key $K_{ij}$ can be used directly by either node I or node J to encrypt a message digest of the packet header or packet header end data. Since the message digest is a small amount of information, there is no need to send or use the transient key $K_p$.

Datagram Multicast Protocols

The method of the present invention may be used in conjunction with datagram multicasting protocols like IP (or IPng) multicast. However, this will require key-management awareness in the establishment and joining process of multicast groups.

It is contemplated that when secure multicasting to a multicast address (M) is required, a group membership creation primitive will establish the secret value, and also provide the public value. For a multicast address M, a randomly generated secret value m is created by the group owner and the public value $\alpha^m$ mod p is computed. Also associated with each group address M is a membership list of addresses that are allowed to transmit and receive encrypted multicast datagrams to and from group address M.

The public value is distributed securely to the nodes on the public networks 22, 26 and/or 30, (see FIG. 2) that wish to transmit to multicast address M. This is accomplished by using the pairwise secure datagram protocol of the present invention described above. Thus, nodes wishing to transmit to group address M acquire the public value $\alpha^m$ mod p from the group owner in a secured datagram from the group owner to the transmitting nodes. The public value $\alpha^m$ mod p is distributed in the form of a certificate that is "signed" (using a SKCS) in the long-term pair-wise shared secret. This allows the group creation primitive to establish lifetimes for the transient secret value m and its corresponding public value.

Nodes wishing to receive encrypted datagrams sent to multicast address M need to acquire the secret value m. This is accomplished by sending the request to join primitive to the group owner. If the requesting node's address is among those that are part of the group's receive membership, then the group owner will send the secret value m, and the associated public value certificate in an encrypted packet, again using the pairwise secure protocol of the present invention previously described above.

A transmitting node (for example node I) wishing to send to group address M will use the value $\alpha^m$ mod p to derive the key $K_{im}$. Transmitting nodes do not need to know the secret value m; all they need to know is the group public value $\alpha^m$ mod p, and knowing their own secret value (i), can compute the shared secret $\alpha^{im}$ mod p from which they derive $K_{im}$. The value $K_{im}$ is then used to encrypt the packet encrypting key $K_p$. Since the receiving nodes know the group secret m, and the public value $\alpha^i$ mod p they can also compute $K_{im}$, and thereby decrypt the packet.

An advantage of the method of the present invention is that only the keying information is distributed in a pairwise fashion. The actual encrypted data packet is sent using the standard multicast delivery mechanisms, thereby allowing the same network bandwidth efficiency that is expected of a network layer multicast protocol when operating over sub-networks which also support multicasting (for example, Ethernet, FDDI, etc). Moreover, how the identity of the group owner is established and communicated to the participating nodes is left to the application layer, although this also needs to be accomplished in a secure fashion, otherwise the underlying key-management facility may be defeated.

The scalability of the present invention's scheme is intended to be limited to a moderate number of nodes, and not an extremely large number of nodes. However, this is not a major limitation, because there is a tradeoff between keeping a value secret and having it be widely distributed.

Management of DH certificates

Since the nodes' public DH values are communicated in the form of certificates, the same type of multi-tier certification structure that is being deployed for PEM, and also by the European PASSWORD. There may be a Top Level Certifying Authority (TLCA) which may constitute the same the Internet Policy Registration Authority (IPRA), Policy Certifying Authorities (PCAs) at the second tier and the organizational Certificate Authorities (CAs) below that.

In addition to the identity certificates, which are part of PEM, additional authorization certificates are needed to properly track the ownership of IP addresses. Since it is desirable to directly use IP addresses in the DH certificates, name subordination principles alone cannot be used to determine if a particular CA has the authority to bind a particular IP address to a DH public key. However, the present invention may use the X.509/PEM certificate format, since the subject Distinguished Name (DN) in the certificate can be the ASCII decimal representation of an IP (or IPng) address.

Since the nodes only have DH public keys, which have no signature capability, the nodes themselves are unable to issue DH certificates. The node certificates are issued by organizational CAs which have jurisdiction over the range of IP addresses that are being certified. The PCAs will have to perform suitable checks (in line with the policy of that PCA), to confirm that the organization which has jurisdiction over a range of addresses is issued a certificate giving it the authority to certify the DH values of individual nodes with those addresses. This authority may be delegated in the form of a authorization certificate signed by the PCA. For the purposes of authorization, the CA's Distinguished Name (DN) will be bound to the range of IP addresses over which it has jurisdiction. The CA has either an RSA or DSA certificate from the PCA. The CA which has authority over a range of IP addresses can delegate authority over part of the range to a subordinate CA, by signing another authorization certificate using its own private key. The organizational CA so authorized is identified by the range of addresses that it can issue certificates for. The range of IP addresses are identified in the certificate in the form of a IP address prefix.

SUMMARY

A key-management scheme that is particularly suited to connectionless datagram protocols such as IP, and many of its replacement candidates like CLNP and SIPP, has been disclosed. Both the protocol and computational overhead of the present invention is relatively low. In band signalled keys incur the length overhead of the block size of a shaped-key cipher. In addition, changing packet encrypting keys involves only a shared-key cipher operation, yet the present invention has the scalability and robustness of a public-key certificate based infrastructure. A major advantage of the present invention is that establishing and changing packet encrypting keys requires no communication between sending and receiving nodes, and no establishment of a pseudo session state between the two sides is required. The present invention may also be used in conjunction with datagram multicast protocols, allowing a single encrypted datagram to be multicast to all the receiving nodes. Although the present invention has been described in conjunction with a few specific exemplary FIGS. 1–5, it will be apparent that many alternatives, modifications and variations may be made in light of the foregoing description.

I claim:

1. In a computer network, a method for securely transmitting messages from a first node I to a second node J, said method comprising the steps of:

providing a first secret value i to node I;

keeping said first secret value i secret from nodes on said computer network other than I;

providing a second secret value j to node J;

keeping said second secret value j secret from nodes on said computer network other than J;

computing a first public value $P_i$ using as input said secret value i;

computing a second public value $P_j$ using as input said secret value j;

computing an implicit shared secret value SS, using as input said secret value i and said public value $P_j$;

deriving a key $K_1$ from said implicit shared secret value SS;

generating a second key $K_2$;

encrypting said second key $K_2$ with said key $K_1$;

encrypting said message with said second key $K_2$;

sending said encrypted second key $K_2$ and said encrypted message from node I to node J; and computing said implicit shared secret value SS, using as input said secret value j and said public value $P_i$.

2. The method of claim 1, further comprising the step of selecting a positive prime integer p and an integer $\alpha$, where said secret values i and j are integers and said public values $P_i$ and $P_j$ equal $\alpha^i$ mod p and $\alpha^j$ mod p respectively, and where said implicit shared secret value SS equals $\alpha^{ij}$ mod p.

3. The method of claim 1, further comprising the step of storing a cached version of said public value $P_i$ at a node different from node I, where said step of computing SS using as input j and $P_i$ uses said cached version of said public value $P_i$.

4. The method of claim 1, further comprising the steps of generating a signed certificate containing said public value $P_i$, verifying that said signed certificate is valid, and extracting said public value $P_i$ from said signed certificate, where said step of computing SS using as input $P_i$ uses said public value $P_i$ extracted from said signed certificate.

5. The method of claim 1, where said step of deriving a key $K_1$ from said implicit shared secret value SS comprises the steps of extracting a predetermined number of low order bits of said implicit shared secret value SS and deriving said key $K_1$ from said predetermined number of low order bits.

6. A method for securely transmitting a message from a first node N to a plurality of other nodes on a computer network, said method comprising the steps of:

providing a first secret value n to node N;

providing a second secret value m;

computing a first public value $P_n$ using as input said first secret value n;

computing a second public value $P_m$ using as input said second secret value m;

securely distributing said second secret value m to said plurality of other nodes;

computing an implicit shared secret value SS, using as input said first secret value n and said second public value $P_m$;

deriving a first key $K_1$ from said implicit shared secret value SS;

generating a second key $K_2$;

encrypting said second key $K_2$ with said first key $K_1$;

encrypting a message with said second key $K_2$;

multicasting said encrypted second key $K_2$ and said encrypted message from node N to said plurality of other nodes; and computing said implicit shared secret value SS, using as input said second secret value m and said first public value $P_n$.

7. The method of claim 6, where said step of securely distributing said second secret value m to said plurality of other nodes comprises the steps of:

selecting a node I which knows said second secret value m;

selecting a third secret value i;

computing a third public value $P_i$ using as input said third secret value i;

selecting a node J different from I in said plurality of other nodes;

selecting a fourth secret value j;

computing a fourth public value $P_j$ using as input said fourth secret value j;

computing a second implicit shared secret value SS', using as input said secret value i and said public value $P_j$;

deriving a third key $K_3$ from said implicit shared secret value SS';

generating a fourth key $K_4$;

encrypting said fourth key $K_4$ with said third key $K_3$;

encrypting said secret value m with said key $K_4$;

sending said encrypted fourth key and said encrypted secret value m from node I to node J; and computing said second implicit shared secret value SS', using as input said secret value j and said public value $P_i$.

8. The method of claim 6, further comprising the step of selecting a positive prime integer p and an integer α, where said secret values m and n are integers and said public values $P_m$ and $P_n$ equal $\alpha^m$ mod p and $\alpha^n$ mod p respectively, and where said implicit shared secret value SS equals $\alpha^{mn}$ mod p.

9. The method of claim 6, where said step of deriving a key $K_1$ from said implicit shared secret value SS comprises the steps of extracting a predetermined number of low order bits of said implicit shared secret value SS and deriving said key $K_1$ from said predetermined number of low order bits.

10. The method of claim 6, further comprising the steps of generating a signed certificate containing said public value $P_n$, verifying that said signed certificate is valid, and extracting said public value $P_n$, from said signed certificate, where said step of computing SS using as input m and $P_n$ uses said public value $P_n$ extracted from said signed certificate.

11. The method of claim 6, further comprising the step of storing a cached version of said public value $P_n$ at a node different from node N, where said step of computing SS using as input m and $P_n$ uses said cached version of said public value $P_n$.

12. An apparatus for securely transmitting messages from a first node I in a computer network to a second node J in said computer network, comprising:

a first secret value generator configured to provide a first secret value i to node I;

a second secret value generator configured to provide a second secret value j to node J;

a device configured to compute a first public value $P_i$ using as input said secret value i;

a device configured to compute a second public value $P_j$ using as input said secret value j;

a device configured to compute an implicit shared secret value SS, using as input said secret value i and said public value $P_j$;

a device configured to derive a key $K_1$ from said implicit shared secret value SS;

a key generator configured to generate a second key $K_2$;

a device configured to encrypt said second key $K_2$ with said second key $K_1$;

a device configured to encrypt said message with said second key $K_2$;

a device configured to send said encrypted second key $K_2$ and said encrypted message from node I to node J; and a device configured to compute said implicit shared secret value SS, using as input said secret value j and said public value $P_i$.

13. The apparatus of claim 12, further comprising a device configured to store a cached version of said public value $P_i$ at a node in said computer network different from node I, where said device configured to compute SS using as input j and $P_i$ uses said cached version of said public value $P_i$.

14. An apparatus for securely transmitting a message from a first node N to a plurality of other nodes on a computer network, said apparatus comprising:

a device configured to provide a first secret value n to said node N;

a device configured to provide a second secret value m;

a device configured to compute a first public value $P_n$ using as input said first secret value n;

a device configured to compute a second public value $P_m$ using as input said second secret value m;

a device configured to securely distribute said second secret value m to said plurality of other nodes;

a device configured to compute an implicit shared secret value SS, using as input said first secret value n and said second public value $P_m$;

a device configured to derive a first key $K_1$ from said implicit shared secret value SS;

a device configured to generate a second key $K_2$;

a device configured to encrypt said second key $K_2$ with said first key $K_1$;

a device configured to encrypt a message with said second key $K_2$;

a device configured to multicast said encrypted second key $K_2$ and said encrypted message from node N to said plurality of other nodes; and a device configured to compute said implicit shared secret value SS, using as input said second secret value m and said first public value $P_n$.

15. The apparatus of claim 14, further comprising a device configured to store a cached version of said public value $P_n$ at a node in said computer network different from node N, where said device configured to compute SS using as input m and $P_n$ uses said cached version of said public value $P_n$.

16. A computer program product comprising a computer usable medium having computer readable code embodied therein for securely transmitting messages from a first node I in a computer network to a second node J in said computer network, said computer usable medium comprising:

a computer readable program code device configured to provide a first secret value n to said node N;

a computer readable program code device configured to provide a second secret value m;

a computer readable program code device configured to compute a first public value $P_n$ using as input said first secret value n;

a computer readable program code device configured to compute a second public value $P_m$ using as input said second secret value m;

a computer readable program code device configured to securely distribute said second secret value m to said plurality of other nodes;

a computer readable program code device configured to compute an implicit shared secret value SS, using as input said first secret value n and said second public value $P_m$;

a computer readable program code device configured to derive a first key $K_1$ from said implicit shared secret value SS;

a computer readable program code device configured to generate a second key $K_2$;

a computer readable program code device configured to encrypt said second key $K_2$ with said first key $K_1$;

a computer readable program code device configured to encrypt a message with said second key $K_2$;

a computer readable program code device configured to multicast said encrypted second key $K_2$ and said encrypted message from node N to said plurality of other nodes; and a computer readable program code device configured to compute said implicit shared secret value SS, using as input said second secret value m and said first public value $P_n$.

17. The computer program product of claim 16, said computer usable medium further comprising a computer readable program code device configured to store a cached version of said public value $P_i$ at a node in said computer network different from node I, where said computer readable program code device configured to compute SS using as input j and $P_i$ uses said cached version of said public value $P_i$.

18. A computer program product comprising a computer usable medium having computer readable code embodied therein for securely transmitting a message from a first node N to a plurality of other nodes on a computer network, said computer usable medium comprising:

a computer readable program code device configured to provide a first secret value n;

a computer readable program code device configured to provide a second secret value m;

a computer readable program code device configured to compute a first public value $P_n$ using as input said first secret value n;

a computer readable program code device configured to compute a second public value $P_m$ using as input said second secret value m;

a computer readable program code device configured to securely distribute said second secret value m to said plurality of other nodes;

a computer readable program code device configured to compute an implicit shared secret value SS, using as input said first secret value n and said second public value $P_m$;

a computer readable program code device configured to derive a first key $K_1$ from said implicit shared secret value SS;

a computer readable program code device configured to generate a second key $K_2$;

a computer readable program code device configured to encrypt said second key $K_2$ with said first key $K_1$;

a computer readable program code device configured to encrypt a message with said second key $K_2$;

a computer readable program code device configured to multicast said encrypted second key $K_2$ and said encrypted message from node N to said plurality of other nodes; and a computer readable program code device configured to compute said implicit shared secret value SS, using as input said second secret value m and said first public value $P_n$.

19. The computer program product of claim 18, said computer usable medium further comprising a computer readable program code device configured to store a cached version of said public value $P_i$ at a node in said computer network different from node I, where said computer readable program code device configured to compute SS using as input j and $P_i$ uses said cached version of said public value $P_i$.

20. A computer network configured to securely transmit messages from a first node I in said computer network to a second node J in said computer network, comprising:

a first secret value generator configured to provide a first secret value i to node I;

a second secret value generator configured to provide a second secret value j to node J;

a device configured to compute a first public value $P_i$ using as input said secret value i;

a device configured to compute a second public value $P_j$ using as input said secret value j;

a device configured to compute an implicit shared secret value SS, using as input said secret value i and said public value $P_j$;

a device configured to derive a key $K_1$ from said implicit shared secret value SS;

a key generator configured to generate a second key $K_2$;

a device configured to encrypt said second key $K_2$ with said second key $K_1$;

a device configured to encrypt said message with said second key $K_2$;

a device configured to send said encrypted second key $K_2$ and said encrypted message from node I to node J; and a device configured to compute said implicit shared secret value SS, using as input said secret value j and said public value $P_i$.

21. The computer network of claim 20, further comprising a device configured to store a cached version of said public value $P_i$ at a node in said computer network different from node I, where said device configured to compute SS using as input j and $P_i$ uses said cached version of said public value $P_i$.

22. A computer network configured to securely transmit a message from a first node N to a plurality of other nodes on said computer network, said computer network comprising:

a device configured to provide a first secret value n to said node N;

a device configured to provide a second secret value m;

a device configured to compute a first public value $P_n$ using as input said first secret value n;

a device configured to compute a second public value $P_m$ using as input said second secret value m;

a device configured to securely distribute said second secret value m to said plurality of other nodes;

a device configured to compute an implicit shared secret value SS, using as input said first secret value n and said second public value $P_m$;

a device configured to derive a first key $K_1$ from said implicit shared secret value SS;

a device configured to generate a second key $K_2$;

a device configured to encrypt said second key $K_2$ with said first key $K_1$;

a device configured to encrypt a message with said second key $K_2$;

a device configured to multicast said encrypted second key $K_2$ and said encrypted message from node N to said plurality of other nodes; and a device configured to compute said implicit shared secret value SS, using as input said second secret value m and said first public value $P_n$.

23. The computer network of claim 22, further comprising a device configured to store a cached version of said public value $P_n$ at a node different from node N, where said device configured to compute SS using as input m and $P_n$ uses said cached version of said public value $P_n$.

* * * * *